(12) United States Patent
Tang

(10) Patent No.: US 11,723,078 B2
(45) Date of Patent: *Aug. 8, 2023

(54) SIGNAL TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/869,539

(22) Filed: Jul. 20, 2022

(65) Prior Publication Data
US 2022/0361252 A1    Nov. 10, 2022

Related U.S. Application Data

(63) Continuation of application No. 17/169,241, filed on Feb. 5, 2021, now Pat. No. 11,432,342, which is a
(Continued)

(51) Int. Cl.
*H04W 4/00* (2018.01)
*H04W 72/02* (2009.01)
(Continued)

(52) U.S. Cl.
CPC ....... *H04W 74/0833* (2013.01); *H04W 72/23* (2023.01); *H04W 74/0808* (2013.01); *H04W 72/044* (2013.01)

(58) Field of Classification Search
CPC ......... H04W 74/0833; H04W 74/0808; H04W 72/042; H04W 72/044; H04W 72/043;
(Continued)

(56) References Cited

U.S. PATENT DOCUMENTS

2017/0367058 A1* 12/2017 Pelletier ............ H04W 72/0446
2018/0176787 A1   6/2018 Fakoorian et al.
(Continued)

FOREIGN PATENT DOCUMENTS

CN    102413515 A    4/2012
CN    103634086 A    3/2014
(Continued)

OTHER PUBLICATIONS

Second Office Action issued in corresponding European application No. 18929874.8, dated Jul. 20, 2022.
First Office Action issued in corresponding Singaporean application No. 11202101363S, dated Sep. 23, 2022.
(Continued)

*Primary Examiner* — Diane L Lo
*Assistant Examiner* — Abusayeed M Haque
(74) *Attorney, Agent, or Firm* — Bayes PLLC

(57) ABSTRACT

A method for transmitting a signal, a terminal device, and a network device are provided, which can reduce a signal transmission delay. The method includes determining, by a terminal device, first indication information, where the first indication information is used for indicating an association relationship between a first uplink transmission opportunity used for uplink transmission and a first downlink transmission opportunity used for downlink transmission. The method also includes sending, by the terminal device, the first indication information to a network device in a time unit corresponding to the first uplink transmission opportunity.

20 Claims, 3 Drawing Sheets

200

A terminal device determines first indication information, where the first indication information is used for indicating an association relationship between a first uplink transmission opportunity used for uplink transmission and a first downlink transmission opportunity used for downlink transmission — S210

The terminal device sends the first indication information to a network device in a time unit corresponding to the first uplink transmission opportunity — S220

Related U.S. Application Data continuation of application No. PCT/CN2018/101107, filed on Aug. 17, 2018.

(51) Int. Cl.
*H04W 74/08* (2009.01)
*H04W 72/23* (2023.01)
*H04W 72/044* (2023.01)

(58) Field of Classification Search
CPC .......... H04W 72/0466; H04W 72/002; H04W 74/0875; H04W 76/10
See application file for complete search history.

(56) References Cited

U.S. PATENT DOCUMENTS

| | | | | |
|---|---|---|---|---|
| 2018/0227936 | A1 | 8/2018 | Yerramalli et al. | |
| 2018/0368169 | A1* | 12/2018 | Jung | H04W 72/21 |
| 2019/0289621 | A1 | 9/2019 | Li et al. | |
| 2019/0380139 | A1* | 12/2019 | Xiong | H04W 72/044 |
| 2020/0059969 | A1* | 2/2020 | Agiwal | H04W 74/0833 |
| 2020/0100284 | A1* | 3/2020 | Li | H04W 74/0808 |
| 2020/0100286 | A1* | 3/2020 | Xu | H04W 72/0446 |
| 2020/0221309 | A1* | 7/2020 | Ozturk | H04W 74/0833 |
| 2021/0058889 | A1* | 2/2021 | Zhang | G01S 5/10 |
| 2021/0058966 | A1* | 2/2021 | Hedayat | H04W 74/0808 |
| 2021/0092763 | A1* | 3/2021 | Li | H04W 48/16 |
| 2021/0351875 | A1* | 11/2021 | Babaei | H04W 74/0808 |
| 2022/0061095 | A1* | 2/2022 | Xue | H04W 72/02 |
| 2022/0183049 | A1* | 6/2022 | Lee | H04W 76/20 |

FOREIGN PATENT DOCUMENTS

| | | |
|---|---|---|
| CN | 106130701 A | 11/2016 |
| CN | 106162656 A | 11/2016 |
| CN | 106211347 A | 12/2016 |
| CN | 106851839 A | 6/2017 |
| CN | 107040350 A | 8/2017 |
| CN | 107801244 A | 3/2018 |
| CN | 108023708 A | 5/2018 |
| CN | 108366431 A | 8/2018 |
| EP | 3361804 A1 | 8/2018 |
| JP | 2017184201 A | 10/2017 |
| RU | 2439855 C2 | 1/2012 |
| WO | 2017196612 A1 | 11/2017 |
| WO | 2018006742 A1 | 1/2018 |
| WO | 2018064372 A1 | 4/2018 |
| WO | 2018103702 A1 | 6/2018 |
| WO | 2018115967 A1 | 6/2018 |
| WO | 2018133124 A1 | 7/2018 |
| WO | 2018137221 A1 | 8/2018 |
| WO | 2020034203 A1 | 2/2020 |

OTHER PUBLICATIONS

First Office Action issued in corresponding Korean application No. 10-2021-7004813, dated Oct. 5, 2022.
"On 2-stage Downlink Control Information for NR", Agenda Item: 7.1.4.1, Source: MediaTek Inc., 3GPP TSG RAN WG1 Meeting #87, R1-1612121, Reno, USA, Nov. 14-18, 2016, 5 pages.
PCT Written Opinion of The International Searching Authority issued in corresponding International Application No. PCT/CN2018/101107, dated Mar. 6, 2019, 7 pages.
First Office action issued in Chinese Application No. 202010711692.6, dated Aug. 31, 2021, 17 pages.
Notice of Priority Review of Patent Application issued in corresponding Chinese Application No. 202010711692.6, dated Aug. 19, 2021, 6 pages.
Extended European Search Report issued in corresponding European Application No. 18929874.8, dated Jul. 8, 2021, 8 pages.
Second Office action issued in corresponding Chinese Application No. 202010711692.6, dated Dec. 7, 2021.
First Office action issued in corresponding India Application No. 202127005499, dated Jan. 12, 2022, 6 pages.
First Office action issued in corresponding Russian Application No. 2021105529, dated Jan. 19, 2022, 13 pages.
First Office action issued in corresponding Canadian Application No. 3,109,526, dated Feb. 9, 2022, 3 pages.
Notification to Grant Patent Right for Invention issued in corresponding Chinese Application No. 202010711692.6, dated Mar. 22, 2022, 6 pages.
Communication issued in corresponding European Application No. 18929874.8, dated Mar. 30, 4 pages.
First Office Action issued in corresponding Japanese Application No. 2021-507021, dated Jun. 28, 2022, 8 pages.
"Summary of email discussion [91-LTE-03] on channel access for AUL", R1-1802362, Source: Intel Corporation, 3GPP TSG RAN WG1 Meeting #92, Athens, Greece, Feb. 26-Mar. 2, 2018, 18 pages.
"Enhancement to configured grants in NR unlicensed", R1-1807392, Source: Qualcomm Incorporated, 3GPP TSG RAN WG1 Meeting #93, Busan, Korea, May 21-May 25, 2018, 6 pages.
"On AUL Channel Access", R1-1720374, Source: Ericsson, 3GPP TSG-RAN WG1 Meeting #91, Reno, USA, Nov. 27-Dec. 1, 2017, 8 pages.
Second Office Action issued in corresponding Japanese application No. 2021-507021, dated Dec. 6, 2022.
First Office Action issued in corresponding Taiwanese application No. 108129376, dated Jan. 9, 2023.
Extended European Search Report issued in corresponding European application No. 23157831.1, dated Mar. 21, 2023.
Decision of Rejection issued in corresponding Korean application No. 10-2021-7004813, dated Apr. 14, 2023.
Notice of Allowance issued in corresponding Japanese application No. 2021-507021, dated Apr. 21, 2023.
Decision of Rejection issued in corresponding Taiwanese application No. 108129376, dated Apr. 21, 2023.

\* cited by examiner

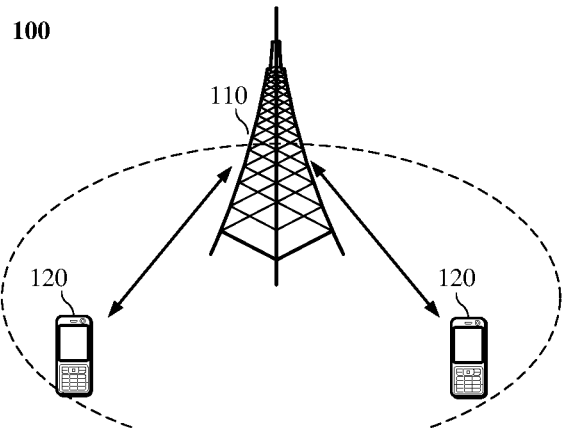

A terminal device determines first indication information, where the first indication information is used for indicating an association relationship between a first uplink transmission opportunity used for uplink transmission and a first downlink transmission opportunity used for downlink transmission — S210

The terminal device sends the first indication information to a network device in a time unit corresponding to the first uplink transmission opportunity — S220

A network device receives first indication information sent by a terminal device, where the first indication information is used for indicating an association relationship between a first uplink transmission opportunity used for uplink transmission and a first downlink transmission opportunity used for downlink transmission — S310

The network device determines, according to the first indication information, the first downlink transmission opportunity used for downlink transmission — S320

FIG. 3

SIGNAL TRANSMISSION METHOD, TERMINAL DEVICE AND NETWORK DEVICE

CROSS-REFERENCE TO RELATED APPLICATION

This application is a continuation of U.S. application Ser. No. 17/169,241, filed on Feb. 5, 2021, which is a continuation of International Application No. PCT/CN2018/101107, entitled "SIGNAL TRANSMISSION METHOD, TERMINAL DEVICE AND NETWORK DEVICE," filed on Aug. 17, 2018, all of which are incorporated by reference in their entireties.

BACKGROUND

Embodiments of the present disclosure relate to the communications field, and specifically, to a method for transmitting a signal, a terminal device, and a network device.

On an unlicensed spectrum, a communications device usually follows a listen before talk (LBT) principle. That is, the communications device needs to perform channel detection first before sending a signal in a channel of the unlicensed spectrum and determine whether to send the signal according to a channel detection result. When the channel detection result is idle, the signal can be sent, and if the channel detection result is busy, the signal cannot be sent.

When a new radio (NR) technology is applied to the unlicensed spectrum, in some scenarios, a terminal device may autonomously initiate the uplink transmission, for example, a random access procedure.

SUMMARY

Embodiments of the present disclosure provide a method for transmitting a signal, a terminal device, and a network device.

According to a first aspect, a method for transmitting a signal is provided, including determining, by a terminal device, first indication information, where the first indication information is used for indicating an association relationship between a first uplink transmission opportunity used for uplink transmission and a first downlink transmission opportunity used for downlink transmission; and sending, by the terminal device, the first indication information to a network device in a time unit corresponding to the first uplink transmission opportunity.

According to a second aspect, a method for transmitting a signal is provided, including receiving, by a network device, first indication information sent by a terminal device, where the first indication information is used for indicating an association relationship between a first uplink transmission opportunity used for uplink transmission and a first downlink transmission opportunity used for downlink transmission; and determining, by the network device according to the first indication information, the first downlink transmission opportunity used for downlink transmission.

According to a third aspect, a terminal device is provided. The terminal device is configured to perform the method according to the first aspect or any possible implementation of the first aspect. Specifically, the terminal device includes units configured to perform the method according to the first aspect or any possible implementation of the first aspect.

According to a fourth aspect, a network device is provided. The network device is configured to perform the method according to the second aspect or any possible implementation of the second aspect. Specifically, the terminal device includes units configured to perform the method according to the second aspect or any possible implementation of the second aspect.

According to a fifth aspect, a terminal device is provided, including a processor and a memory. The memory is configured to store a computer program, and the processor is configured to invoke and run the computer program stored in the memory to perform the method according to the first aspect or implementations thereof.

According to a sixth aspect, a network device is provided, including a processor and a memory. The memory is configured to store a computer program, and the processor is configured to invoke and run the computer program stored in the memory to perform the method according to the second aspect or implementations thereof.

According to a seventh aspect, a chip is provided. The chip is configured to perform the method according to any one of the first aspect and the second aspect or implementations thereof.

Specifically, the chip includes a processor configured to invoke a computer program from a memory and run the computer program to enable a device installed with the chip to perform the method according to any one of the first aspect and the second aspect or implementations thereof.

According to an eighth aspect, a computer-readable storage medium is provided. The computer-readable storage medium is configured to store a computer program, and the computer program enables a computer to perform the method according to any one of the first aspect and the second aspect or implementations thereof.

According to a ninth aspect, a computer program product is provided. The computer program product includes a computer program instruction, and the computer program instruction enables a computer to perform the method according to any one of the first aspect and the second aspect or implementations thereof.

According to a tenth aspect, a computer program is provided. When the program is run on a computer, the computer is enabled to perform the method according to any one of the first aspect and the second aspect or implementations thereof.

BRIEF DESCRIPTION OF THE DRAWINGS

FIG. 1 is a schematic diagram of a communications system architecture according to an embodiment of the present disclosure.

FIG. 2 is a schematic flowchart of a method for transmitting a signal according to an embodiment of the present disclosure.

FIG. 3 is a schematic diagram of a method for transmitting a signal according to another embodiment of the present disclosure.

DETAILED DESCRIPTION

Figure 4:
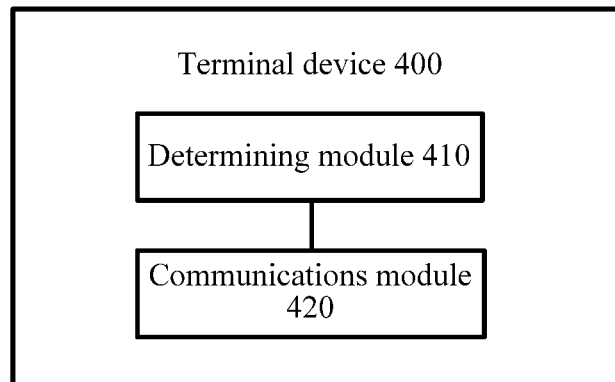
FIG. 4 is a schematic block diagram of a terminal device according to an embodiment of the present disclosure.

The technical solutions of the embodiments of the present disclosure will be described in the following with reference to the accompanying drawings. It is obvious that the embodiments to be described are some rather than all of the embodiments of the present disclosure. All other embodiments obtained by a person of ordinary skill in the art based on the embodiments of the present disclosure without creative efforts shall fall within the protection scope of the present disclosure.

The technical solutions in the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or a 5G system.

For example, a communications system 100 used in an embodiment of the present disclosure is shown in FIG. 1. The communications system 100 may include a network device 110, and the network device 110 may be a device communicating with a terminal device 120 (or referred to as a communications terminal or a terminal). The network device 110 may provide communication coverage for a particular geographical area and may communicate with a terminal device that is located in the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, a network device in a future evolved public land mobile network (PLMN), or the like.

The communications system 100 further includes at least one terminal device 120 located inside a coverage area of the network device 110. The "terminal device" used herein includes, but is not limited to a device that is configured to receive/transmit communication signals via a wired connection, such as via a public switched telephone network (PSTN), digital subscriber line (DSL), digital cable, direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another terminal device; and/or an Internet of Things (IoT) device. A terminal device configured to communicate through a wireless interface may be referred to as a "wireless communications terminal," "wireless terminal," or "mobile terminal." Examples of the mobile terminal include, but are not limited to, a satellite or a cellular telephone; a personal communications system (PCS) terminal that may combine a cellular radiotelephone with data processing, facsimile, and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. A terminal device may be an access terminal, user equipment (User Equipment, UE), a subscriber unit, a subscriber station, a mobile station, a mobile, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform device to device (D2D) communication with each other.

Optionally, the 5G system or 5G network may be further referred to as a new radio (NR) system or NR network.

FIG. 1 shows one network device and two terminal devices as an example. Optionally, the communications system 100 may include a plurality of network devices, and coverage of each network device may include another quantity of terminal devices. The quantity is not limited in the embodiments of the present disclosure.

Optionally, the communications system 100 may further include other network entities such as a network controller and a mobility management entity. The entity is not limited in the embodiments of the present disclosure.

The communications systems in the embodiments of the present disclosure may be applied to a carrier aggregation (CA) scenario, or be applied to a dual connectivity (DC) scenario, or be applied to a standalone (SA) net scenario.

When the communications systems in the embodiments of the present disclosure are applied to an unlicensed spectrum, and the net scenario is CA, the CA net scenario may be that a primary carrier is on a licensed spectrum, a secondary carrier is on the unlicensed spectrum, and the primary carrier and the secondary carrier are connected through ideal backhaul.

When the communications systems in the embodiments of the present disclosure is applied to an unlicensed spectrum, and the net scenario is DC, the DC net scenario may be that a primary carrier is on a licensed spectrum, a secondary carrier is on the unlicensed spectrum, and the primary carrier and the secondary carrier are connected through non-ideal backhaul. A system on the primary carrier may be different from a system on the secondary carrier. For example, the system on the primary carrier is an LTE system, and the system on the secondary carrier is an NR system. Alternatively, the system on the primary carrier may be the same as the system on the secondary carrier, for example, both the systems on the primary carrier and the secondary carrier are LTE systems or NR systems.

When the communications systems in the embodiments of the present disclosure is applied to an unlicensed spectrum, and the net scenario is SA, the terminal device may connect to a network through a system on the unlicensed spectrum.

By way of example, and not limitation, in the embodiments of the present disclosure, the unlicensed spectrum resource may include a frequency band near 5 Giga Hertz (GHz), a frequency band near 2.4 GHz, a frequency band near 3.5 GHz, a frequency band near 37 GHz, and a frequency band near 60 GHz.

It should be understood that terms "system" and "network" in this specification are usually interchangeably used in this specification. The term "and/or" in this specification is merely an association relationship for describing associated objects and represents that three types of relationships may exist. For example, A and/or B may represent the following three cases: Only A exists, both A and B exist, and only B exists. In addition, the character "/" in this specification generally indicates an "or" relationship between the associated objects.

The following describes the method for transmitting a signal of the embodiments of the present disclosure with reference to FIG. 2 and FIG. 3. It should be understood that FIG. 2 and FIG. 3 show main steps or operations of the method for transmitting a signal of the embodiments of the present disclosure, but these steps or operations are merely examples and in the embodiments of the present disclosure, other operations, or variants of the operations in FIG. 2 and FIG. 3 may further be performed. In addition, the steps in the method embodiments of the present disclosure may be alternatively performed in an order different from that presented in the method embodiments, and the operations in the method embodiments may not necessarily be all performed.

FIG. 2 is a schematic flowchart of a method for transmitting a signal according to an embodiment of the present disclosure. As shown in FIG. 2, the method 200 includes the following content.

S210: A terminal device determines first indication information, where the first indication information is used for indicating an association relationship between a first uplink transmission opportunity used for uplink transmission and a first downlink transmission opportunity used for downlink transmission.

S220: The terminal device sends the first indication information to a network device in a time unit corresponding to the first uplink transmission opportunity.

In this embodiment of the present disclosure, before transmitting a signal on an unlicensed spectrum, the terminal device needs to first perform channel detection on a carrier of the unlicensed spectrum. If the channel detection succeeds, the terminal device obtains an uplink transmission opportunity. In a time unit of the uplink transmission opportunity, the terminal device may perform uplink transmission, for example, sending a random access preamble (also referred to as MSG1) or a message 3 (that is, MSG3) in a random access procedure to a network device, or the terminal device may send another uplink signal to the network device. This is not limited to this embodiment of the present disclosure.

It should be understood that, in this embodiment of the present disclosure, an uplink transmission opportunity may be a time unit in which the terminal device performs continuous transmission. One time unit may be one or more subframes, or may be one or more slots, or may be one or more mini-slots, or the like. This is not limited to this embodiment of the present disclosure.

It should be further understood that a start time unit and/or an end time unit of an uplink transmission opportunity may be a complete time unit, such as a complete subframe, a complete slot, or a complete mini-slot, or may be a part of a time unit, such as a part of a subframe, a part of a slot, or a part of a mini-slot. This is not limited to this embodiment of the present disclosure.

Correspondingly, a downlink transmission opportunity may be a time unit in which the network device performs continuous transmission. One time unit may be one or more subframes, or may be one or more slots, or may be one or more mini-slots, or the like. This is not limited to this embodiment of the present disclosure.

Optionally, a start time unit and/or an end time unit of a downlink transmission opportunity may be a complete time unit, such as a complete subframe, a complete slot, or a complete mini-slot, or may be a part of a time unit, such as a part of a subframe, a part of a slot, or a part of a mini-slot. This is not limited to this embodiment of the present disclosure.

In this embodiment of the present disclosure, a channel access type (or a channel detection manner) used by the terminal device to obtain the uplink transmission opportunity may include a first channel access type and a second channel access type. The first channel access type may be understood as clear channel assessment (CCA) of a single detection, and the second channel access type may be understood as CCA based on a contention window.

Optionally, in some embodiments, the channel detection of the first channel access type may include the following procedure.

Before sending a signal, the terminal device first performs channel detection with a length of Tone-shot on the carrier of the unlicensed spectrum. If a channel detection result is idle, it is regarded that an LBT succeeds, that is, the channel detection succeeds; and if the channel detection result is that the channel is busy, it is regarded that the LBT fails, that is, the channel detection fails. Optionally, the length of Tone-shot may be indicated by the network device, or determined according to a service priority, or specified in a communications system. Optionally, in some embodiments, the length of Tone-shot may be 25 μs.

That is, for the channel detection of the first channel access type, if a result of a single channel detection is that the channel is busy, it is regarded that the channel detection fails, and if the result of the single channel detection is that the channel is idle, it is regarded that the channel detection succeeds.

Optionally, in some embodiments, the second channel access type is channel detection based on a contention window. A size of the contention window may be determined according to a channel access priority. The channel access priority may correspond to a set of channel access parameters. As shown in FIG. 1, when the channel detection is performed according to the second channel access type, the channel detection may be performed according to the channel access parameters corresponding to the channel access priority. It should be understood that, in table 1, a smaller number corresponding to the channel access priority represents a higher priority. Optionally, the channel access priority may be determined according to a length of a time domain resource of a to-be-sent signal or a priority of a to-be-sent signal.

Optionally, in some embodiments, the channel detection of the second channel access type may specifically include the following steps S1: Set a count value N of a counter to $N_{init}$, where $N_{init}$ is a uniformly distributed random number from 0 to $CW_p$, and perform step S4.

S2: Subtract the count value of the counter by 1 if N is greater than 0, that is, N=N−1.

S3: Perform CCA slot detection with a length of $T_{sl}$ (the length of $T_{sl}$ is 9 μs, that is, a length of a CCA slot is 9 μs) on a channel, and if the CCA slot is idle, perform step S4; otherwise, perform step S5.

S4: End a channel access procedure if N is equal to 0; or otherwise, perform step S2.

S5: Perform CCA slot detection with a time length of $T_d$ ($T_d$=16+$m_p$*9 (μs)) on the channel, where a result of the CCA detection is that at least one CCA slot is occupied, or all CCA slots are idle.

S6: Perform step S4 if the channel detection result is that all the CCA slots in the $T_d$ time are idle; otherwise, perform step S5.

It should be noted that, in the channel detection of the second channel access type, the channel detection can be regarded to be successful only when the channel access procedure ends. Otherwise, the channel detection is regarded to be failed. The channel detection is not regarded to be successful when the channel is idle. $CW_p$ and the $m_p$ may be determined according to the service priority.

TABLE 1

| Channel access Priority (p) | $m_P$ | $CW_{min,p}$ | $CW_{max,p}$ | $T_{mcot,p}$ | Allowed size of $CW_p$ |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 ms/10 ms | {15, 31, 63} |
| 4 | 7 | 15 | 1023 | 8 ms/10 ms | {15, 31, 63, 127, 255, 511, 1023} |

$CW_{min,p}$ is a minimum value of $CW_p$ corresponding to the channel access priority p, $CW_{max,p}$ is a maximum value of $CW_p$ corresponding to the channel access priority p, and $T_{m\_cot,p}$ is a maximum length of time that may be occupied when a signal corresponding to the channel access priority p is transmitted.

It should be understood that, in this embodiment of the present disclosure, a channel access parameter table corresponding to the channel access priority may be a channel access parameter table, which is used for downlink channel access, in a current LTE system, for example, Table 1. Alternatively, the channel access parameter table may be a channel access parameter table, which is used for uplink channel access in the current LTE system. Optionally, the channel access parameter table may further be a channel access parameter table newly defined according to a transmission length supported by the signal. This is not limited to this embodiment of the present disclosure.

In this embodiment of the present disclosure, the terminal device may determine the first indication information, and the first indication information may be used for indicating the association relationship between the first uplink transmission opportunity, which is used for uplink transmission, of the terminal device and the first downlink transmission opportunity used by the network device to perform subsequent downlink transmission. Further, the terminal device may notify the network device of the first indication information in the uplink transmission, so that the network device may determine the association relationship between the first uplink transmission opportunity and the first downlink transmission opportunity according to the first indication information, and may further determine, according to the association relationship, information such as the time unit of the first downlink transmission opportunity or a channel access type used in the channel detection before the downlink transmission. For example, if the network device determines, according to the association relationship, a time unit in which the first uplink transmission opportunity may be shared, when the network device is used as a transmit end, the network device may skip the channel detection or only need to perform channel detection with a short time length (for example, using a second channel access type with a relatively high priority) before performing the downlink transmission, which helps reduce a signal transmission delay.

Optionally, as an embodiment, the terminal device may notify the network device of the first indication information, and specifically, the first indication information may be carried in an uplink message sent by the terminal device to the network device. For example, the first indication information may be carried in a MSG1 or MSG3 sent by the terminal device to the network device, that is, the first indication information is carried through the MSG1 or MSG3. Alternatively, the terminal device may further notify the network device of the first indication information through another uplink message, another uplink signal, another uplink channel, or the like. This is not specifically limited in this embodiment of the present disclosure.

Optionally, as an embodiment, the terminal device may implicitly indicate the first indication information by sending a resource of an uplink message, an uplink signal, or an uplink channel. For example, the terminal device may send the MSG1 to the network device and may implicitly indicate the first indication information by sending at least one of a time domain resource, a frequency domain resource, and a code domain resource of the MSG1. That is, sending different time domain resources, frequency domain resources, or code domain resources of the MSG1 may be used for indicating different first indication information. Certainly, the terminal device may further indicate the first indication information to the network device in another manner. This is not specifically limited to this embodiment of the present disclosure.

It should be understood that, the uplink channel of this embodiment of the present disclosure may include a physical random access channel (PRACH), a physical uplink control channel (PUCCH), a physical uplink shared channel (PUSCH), and the like. This is not limited to the present disclosure.

It should be further understood that the uplink signal of this embodiment of the present disclosure may include a demodulation reference signal (DMRS), a sounding reference signal (SRS), a phase tracking reference signal (PT-RS), and the like. This is not limited to the present disclosure.

Optionally, in some embodiments, the association relationship indicated by the first indication information may include whether a time unit of the first uplink transmission opportunity includes a time unit of the first downlink transmission opportunity.

That is, the association relationship may include whether the time unit of the first uplink transmission opportunity may be shared with the first downlink transmission opportunity.

Optionally, the terminal device may determine whether to share the time unit of the first uplink transmission opportunity with the first downlink transmission opportunity according to a channel occupation time of the first uplink transmission opportunity. For example, if the first uplink transmission opportunity is obtained through CCA of a low priority, a maximum channel occupation time (MCOT) of the first uplink transmission opportunity is usually relatively long. In this case, the terminal device regards that the time unit of the first uplink transmission opportunity may be shared with the first downlink transmission opportunity for use, and the terminal device may indicate the association relationship to the network device through the first indication information. After receiving the first indication information, according to the association relationship, the network device determines that the time unit of the first uplink transmission opportunity includes the time unit of the first downlink transmission opportunity, that is, the time unit of the first uplink transmission opportunity may be shared with the first downlink transmission opportunity for use. In this case, the network device may skip the channel detection or only need to perform CCA of a relatively high priority (that is, the channel detection with a short time length) before using the time unit of the first uplink transmission opportunity to perform the downlink transmission, which helps reduce a signal transmission delay.

Optionally, in some specific embodiments, if the terminal device determines that the time unit of the first uplink transmission opportunity may be shared with the first downlink transmission opportunity, the association relationship may further include shared information between the first uplink transmission opportunity and the first downlink transmission opportunity. By way of example, and not limitation, the shared information may include at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity, or may include another association information capable of being used for determining the time unit or the channel access type of the first downlink transmission opportunity. This is not limited to this embodiment of the present disclosure.

It should be understood that, herein, the channel access type of the first uplink transmission opportunity may be a channel access type used to obtain the first uplink transmission opportunity, that is, a channel access manner through which the first uplink transmission opportunity is obtained. The time unit of the first downlink transmission opportunity may be a time domain location in which the network device performs the downlink transmission, for example, a start time unit or time window of the first downlink transmission opportunity. Correspondingly, meanings of the channel access type and the time unit of the first downlink transmission opportunity are similar to the foregoing and are not described herein again.

Optionally, in some embodiments, the time unit of the first downlink transmission opportunity may be determined by the terminal device according to the time unit of the first uplink transmission opportunity. For example, the terminal device may determine a part of the time unit of the first uplink transmission opportunity as the time unit of the first downlink transmission opportunity, or there is a time interval between the time unit of the first uplink transmission opportunity and the time unit of the first downlink transmission opportunity. The terminal device may determine the time unit of the first downlink transmission opportunity according to the time unit of the first uplink transmission opportunity and the time interval. For example, the terminal device may determine a time unit of a first time interval after the start time unit of the first uplink transmission as the start time unit of the first downlink transmission opportunity.

Optionally, in some embodiments, the channel access type of the first downlink transmission opportunity may be determined by the terminal device according to the channel access type of the first uplink transmission opportunity, that is, the terminal device may determine, according to the channel access type of the first uplink transmission opportunity, a channel access type used by the network device to perform the channel detection before performing the downlink transmission. For example, if the first uplink transmission opportunity is obtained according to the second channel access type, and a corresponding channel access priority is relatively low, the terminal device may determine that the channel access type of the first downlink transmission opportunity may be the first channel access type. Alternatively, if the first uplink transmission opportunity is obtained by using the first channel access type, the terminal device may determine that the channel access type of the downlink transmission opportunity may be the second channel access type with a relatively low priority.

Optionally, in some embodiments, the network device may further determine the channel access type or the time unit of the first downlink transmission opportunity according to the channel access type of the first uplink transmission opportunity included in the association information. For example, if the first uplink transmission opportunity is obtained according to the second channel access type, and a corresponding channel access priority is relatively low, the network device may determine the channel access type of the first downlink transmission opportunity as the first channel access type, or determine that the first downlink transmission opportunity may share the time unit of the first uplink transmission opportunity. Alternatively, if the first uplink transmission opportunity is obtained by using the first channel access type, the network device may determine that the channel access type of the downlink transmission opportunity may be the second channel access type with a relatively low priority.

Optionally, in some embodiments, the terminal device may determine, according to the channel access type of the first uplink transmission opportunity or channel access priority information, content indicated by the first indication information.

For example, if the channel access type of the first uplink transmission opportunity is the second channel access type, and the channel access priority is lower than a preset priority threshold, in this case, the terminal device regards that the time unit of the first uplink transmission opportunity may be shared with the first uplink transmission opportunity. Therefore, the terminal device determines that the first indication information is used for indicating the time unit of the first downlink transmission opportunity used for the downlink transmission and/or the channel access type of the first uplink transmission opportunity, so that the network device may share the first uplink transmission opportunity according to the first indication information, which helps reduce a signal transmission delay. Alternatively, if the channel access type of the first uplink transmission opportunity is the second channel access type, and the channel access priority is higher than the preset priority threshold, the terminal device determines that the first indication information is used for indicating the channel access type of the first downlink transmission opportunity, the channel access type of the first uplink transmission opportunity, or the channel access priority information.

In the foregoing embodiments, the first indication information is determined by the terminal device, and before performing the uplink transmission, the terminal device may determine the first indication information. Further, the network device may be notified of the association relationship between the uplink transmission opportunity of the terminal device and the subsequent downlink transmission opportunity of the network device, so that the network device may appropriately share the uplink transmission opportunity according to the association relationship when the uplink transmission opportunity can be shared, which helps reduce a signal transmission delay. When the sharing of the uplink transmission opportunity is applied to a random access procedure, a random access delay can be reduced so that user experience can be improved.

Optionally, in some embodiments, that a terminal device determines first indication information includes:

receiving, by the terminal device, second indication information sent by the network device, where the second indication information is used for indicating an association relationship between an uplink transmission opportunity used for uplink transmission and a downlink transmission opportunity used for downlink transmission; and determining the second indication information as the first indication information.

It should be understood that, in this embodiment, the first indication information may be determined by the terminal device according to the second indication information sent by the network device. For example, the second indication information may be used for indicating a channel access type used by the terminal device to perform the channel detection to obtain the first uplink transmission opportunity, or the second indication information may further be used for indicating whether the first uplink transmission opportunity is shared with the first downlink transmission opportunity, whether the terminal device is allowed to share the uplink transmission opportunity, or the like.

Optionally, in some embodiments, the second indication information may be sent by the network device through a physical downlink control channel (PDCCH) order, and the PDCCH order may be used for controlling the terminal device to initiate a non-contention based random access procedure.

That is, in this embodiment of the present disclosure, the autonomous uplink transmission initiated by the terminal device may be contention-based random access or may be non-contention based random access triggered based on the network device. In both of the foregoing random access procedures, the terminal device may send the first indication information to the network device and notify the network device of the association relationship between the uplink transmission opportunity of the terminal device and the subsequent downlink transmission opportunity of the network device, so that the network device may appropriately share the uplink transmission opportunity according to the association relationship, thereby reducing the random access delay.

With reference to FIG. 2, the foregoing describes the method for transmitting a signal according to this embodiment of the present disclosure in detail from a perspective of a terminal device. With reference to FIG. 3, the following describes a method for transmitting a signal according to another embodiment of the present disclosure in detail from a perspective of a network device. It should be understood that the description of the network device side corresponds to the description of the terminal device side, and for a similar description, refer to the foregoing description. To avoid repetition, details are not described herein again.

FIG. 3 is a schematic flowchart of a method 300 for transmitting a signal according to another embodiment of the present disclosure. The method 300 may be performed by a network device in the communications system shown in FIG. 1. As shown in FIG. 3, the method 300 includes the following content:

S310: A network device receives first indication information sent by a terminal device, where the first indication information is used for indicating an association relationship between a first uplink transmission opportunity used for uplink transmission and a first downlink transmission opportunity used for downlink transmission.

S320: The network device determines, according to the first indication information, the first downlink transmission opportunity used for downlink transmission.

Optionally, in some embodiments, the association relationship may include whether a time unit of the first uplink transmission opportunity includes a time unit of the first downlink transmission opportunity.

Optionally, in some embodiments, the association relationship includes association information between the first uplink transmission opportunity and the first downlink transmission opportunity, where the association information includes at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

Optionally, in some embodiments, if the association information includes the time unit of the first uplink transmission opportunity and the time interval information, the network device may determine the time unit of the first uplink transmission opportunity according to the time unit of the first uplink transmission opportunity and the time interval information. For example, the network device may determine a time unit of a first time interval after the start time unit of the first uplink transmission opportunity as the start time unit of the first downlink transmission opportunity.

Optionally, in some embodiments, if the association information includes the channel access type used by the first uplink transmission opportunity, that is, a channel access type through which the terminal device performs the channel detection to obtain the first uplink transmission opportunity. The network device may determine, according to the channel access type of the first uplink transmission opportunity, the channel access type used by the network device to obtain the downlink transmission opportunity. For example, if the first uplink transmission opportunity is obtained according to the second channel access type, and a corresponding channel access priority is relatively low, the network device may determine that the channel access type of the first downlink transmission opportunity may be the first channel access type. Alternatively, if the first uplink transmission opportunity is obtained by using the first channel access type, the network device may determine that the channel access type of the downlink transmission opportunity may be the second channel access type with a relatively low priority.

That is, if the first uplink transmission opportunity is obtained through CCA of a low priority, an MCOT of the first uplink transmission opportunity is relatively long, and in this case, the network device may share the time unit of the first uplink transmission opportunity. As a result, the network device may directly perform the downlink transmission without performing the channel detection or may further perform CCA of a relatively high priority to obtain the downlink transmission opportunity, which helps reduce a signal transmission delay.

Optionally, in some embodiments, that a network device receives first indication information sent by a terminal device includes receiving, by the network device, a random access preamble sent by the terminal device, where at least one of the following resources used for transmitting the random access preamble is used for indicating the first indication information: a time domain resource, a frequency domain resource, and a code domain resource.

Optionally, in some embodiments, that a network device receives first indication information sent by a terminal device includes receiving, by the network device, a message 3 (MSG3) that is used for random access and that is sent by the terminal device, the MSG3 carrying the first indication information.

Optionally, in some embodiments, the method further includes sending, by the network device, second indication information to the terminal device, where the second indication information is used for indicating an association relationship between an uplink transmission opportunity used for uplink transmission and a downlink transmission opportunity used for downlink transmission, and the second indication information is used by the terminal device to determine the first indication information.

Optionally, in some embodiments, the sending, by the network device, second indication information to the terminal device includes sending, by the network device, the second indication information to the terminal device through a physical downlink control channel (PDCCH) order.

Optionally, in some embodiments, the PDCCH order is used for controlling the terminal device to initiate a non-contention based random access procedure.

Optionally, in some embodiments, a time interval between the time unit of the first downlink transmission opportunity and the time unit of the first uplink transmission opportunity is a first time interval.

Optionally, in some embodiments, the first time interval is indicated by the first indication information, or is a predefined time interval.

Method embodiments of the present disclosure are described above in detail with reference to FIG. 2 to FIG. 3, and apparatus embodiments of the present disclosure are described below in detail with reference to FIG. 4 to FIG. 8. It should be understood that the apparatus embodiments and the method embodiments correspond to each other. For similar descriptions, refer to the method embodiments.

FIG. 4 is a schematic block diagram of a terminal device 400 according to an embodiment of the present disclosure. As shown in FIG. 4, the terminal device 400 includes a determining module 410, configured to determine first indication information, where the first indication information is used for indicating an association relationship between a first uplink transmission opportunity used for uplink transmission and a first downlink transmission opportunity used for downlink transmission; and a communications module 420, configured to send the first indication information to a network device in a time unit corresponding to the first uplink transmission opportunity.

Optionally, in some embodiments, the association relationship may include whether a time unit of the first uplink transmission opportunity includes a time unit of the first downlink transmission opportunity.

Optionally, in some embodiments, the association relationship includes association information between the first uplink transmission opportunity and the first downlink transmission opportunity, where the association information includes at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

Optionally, in some embodiments, the communications module 420 is specifically configured to send a random access preamble to the network device, where at least one of the following resources used for transmitting the random access preamble is used for indicating the first indication information: a time domain resource, a frequency domain resource, and a code domain resource.

Optionally, in some embodiments, the communications module 420 is further configured to send a message 3 (MSG3) used for random access to the network device, the MSG3 carrying the first indication information.

Optionally, in some embodiments, the communications module 420 is specifically configured to receive second indication information sent by the network device, where the second indication information is used for indicating an association relationship between an uplink transmission opportunity used for uplink transmission and a downlink transmission opportunity used for downlink transmission; and the determining module 410 is further configured to determine the second indication information as the first indication information.

Optionally, in some embodiments, the communications module 420 is further configured to receive, by the terminal device, the second indication information, where the second indication information is sent by the network device through a physical downlink control channel (PDCCH) order.

Optionally, in some embodiments, the PDCCH order is used for controlling the terminal device to initiate a non-contention based random access procedure.

Optionally, in some embodiments, a time interval between the time unit of the first downlink transmission opportunity and the time unit of the first uplink transmission opportunity is a first time interval.

Optionally, in some embodiments, the first time interval is indicated by the first indication information, or is a predefined time interval.

Specifically, the terminal device 400 may correspond to (for example, the terminal device 400 may be configured as or may be) the terminal device described in the foregoing method 200, and the modules or units in the terminal device 400 are respectively configured to perform the actions or processing procedures performed by the terminal device in the foregoing method 200. Herein, to avoid repetition, detailed descriptions are omitted.

Figure 5:
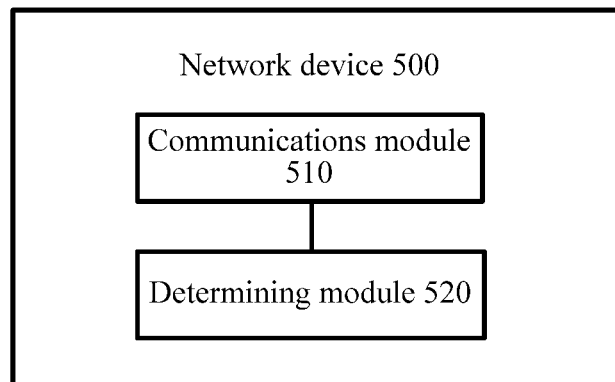
FIG. 5 is a schematic block diagram of a network device according to an embodiment of the present disclosure.

FIG. 5 is a schematic block diagram of a network device according to an embodiment of the present disclosure. The network device 500 in FIG. 5 includes a communications module 510, configured to receive first indication information sent by a terminal device, where the first indication information is used for indicating an association relationship between a first uplink transmission opportunity used for uplink transmission and a first downlink transmission opportunity used for downlink transmission; and a determining module 520, configured to determine, according to the first indication information, the first downlink transmission opportunity used for downlink transmission.

Optionally, in some embodiments, the association relationship may include whether a time unit of the first uplink transmission opportunity includes a time unit of the first downlink transmission opportunity.

Optionally, in some embodiments, the association relationship includes association information between the first uplink transmission opportunity and the first downlink transmission opportunity, where the association information includes at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

Optionally, in some embodiments, the communications module 510 is specifically configured to receive a random access preamble sent by the terminal device, where at least one of the following resources used for transmitting the random access preamble is used for indicating the first indication information: a time domain resource, a frequency domain resource, and a code domain resource.

Optionally, in some embodiments, the communications module 510 is specifically configured to receive a message 3 (MSG3) that is used for random access and that is sent by the terminal device, the MSG3 carrying the first indication information.

Optionally, in some embodiments, the communications module 510 is further configured to send second indication information to the terminal device, where the second indication information is used for indicating an association relationship between an uplink transmission opportunity used for uplink transmission and a downlink transmission opportunity used for downlink transmission, and the second indication information is used by the terminal device to determine the first indication information.

Optionally, in some embodiments, the communications module 510 is further configured to send the second indication information to the terminal device through a physical downlink control channel (PDCCH) order.

Optionally, in some embodiments, the PDCCH order is used for controlling the terminal device to initiate a non-contention based random access procedure.

Optionally, in some embodiments, a time interval between the time unit of the first downlink transmission opportunity and the time unit of the first uplink transmission opportunity is a first time interval.

Optionally, in some embodiments, the first time interval is indicated by the first indication information or is a predefined time interval.

Specifically, the network device 500 may correspond to (for example, the network device 500 may be configured as or may be) the network device described in the foregoing method 300, and the modules or units in the network device 500 are respectively configured to perform the actions or processing procedures performed by the network device in the foregoing method 300. Herein, to avoid repetition, detailed descriptions are omitted.

Figure 6:
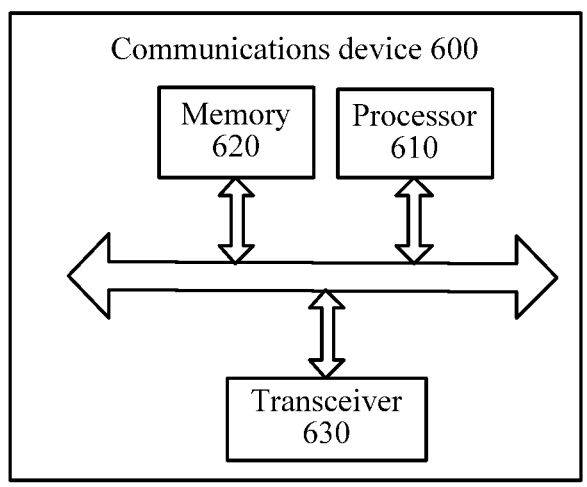
FIG. 6 is a schematic block diagram of a communications device according to an embodiment of the present disclosure.

FIG. 6 is a schematic structural diagram of a communications device 600 according to an embodiment of the present disclosure. The communications device 600 shown in FIG. 6 includes a processor 610. The processor 610 may invoke a computer program from a memory and run the computer program, to implement the method in the embodiments of the present disclosure.

Optionally, as shown in FIG. 6, the communications device 600 may further include a memory 620. The processor 610 may invoke the computer program from the memory 620 and run the computer program, to implement the method in the embodiments of the present disclosure.

The memory 620 may be a separate device independent of the processor 610 or may be integrated in the processor 610.

Optionally, as shown in FIG. 6, the communications device 600 may further include a transceiver 630. The processor 610 may control the transceiver 630 to communicate with other devices. Specifically, the transceiver may send information or data to other devices or receive information or data sent by other devices.

The transceiver 630 may include a transmitter and a receiver. The transceiver 630 may further include an antenna, and a quantity of antennas may be one or more.

Optionally, the communications device 600 may be specifically the network device in the embodiments of the present disclosure, and the communications device 600 may implement corresponding procedures implemented by the network device in the methods in the embodiments of the present disclosure. For brevity, details are not described herein again.

Optionally, the communications device 600 may be specifically a mobile terminal/terminal device in the embodiments of the present disclosure, and the communications device 600 may implement corresponding procedures implemented by the mobile terminal/terminal device in the methods in the embodiments of the present disclosure. For brevity, details are not described herein again.

Figure 7:
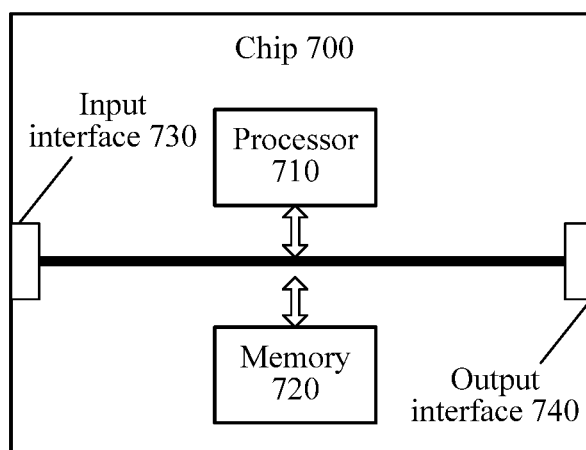
FIG. 7 is a schematic block diagram of a chip according to an embodiment of the present disclosure.

FIG. 7 is a schematic structural diagram of a chip according to an embodiment of the present disclosure. The chip 700 shown in FIG. 7 includes a processor 710. The processor 710 may invoke a computer program from a memory and run the computer program, to implement the method in the embodiments of the present disclosure.

Optionally, as shown in FIG. 7, the chip 700 may further include a memory 720. The processor 710 may invoke the computer program from the memory 720 and run the computer program, to implement the method in the embodiments of the present disclosure.

The memory 720 may be a separate component independent of the processor 710 or may be integrated into the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device in the embodiments of the present disclosure, and the chip may implement corresponding procedures implemented by the network device in the methods in the embodiments of the present disclosure. For brevity, details are not described herein again.

Optionally, the chip may be applied to a mobile terminal/terminal device in the embodiments of the present disclosure, and the chip may implement corresponding procedures implemented by the mobile terminal/terminal device in the methods in the embodiments of the present disclosure. For brevity, details are not described herein again.

It should be understood that the chip mentioned in the embodiments of the present disclosure may also be referred to as a system-level chip, a system chip, a chip system, a system on chip, or the like.

Figure 8:
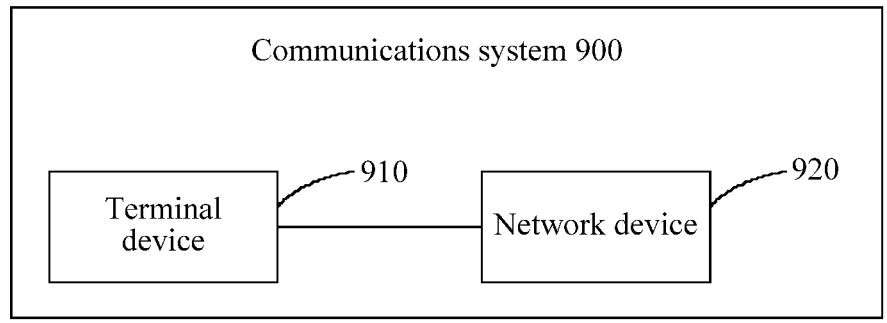
FIG. 8 is a schematic block diagram of a communications system according to an embodiment of the present disclosure.

FIG. 8 is a schematic block diagram of a communications system 900 according to an embodiment of the present disclosure. As shown in FIG. 8, the communications system 900 includes a terminal device 910 and a network device 920.

The terminal device 910 may be configured to implement the corresponding functions implemented by the terminal device in the foregoing method, and the network device 920 may be configured to implement the corresponding functions implemented by the network device in the foregoing method. For brevity, details are not described herein again.

It should be understood that the processor of this embodiment of the present disclosure may be an integrated circuit chip and has a signal processing capability. In an implementation process, steps in the foregoing method embodiments can be implemented by using a hardware integrated logical circuit in the processor or by using instructions in the form of software. The processor may be a general-purpose processor, a digital signal processor (DSP), an application-specific integrated circuit (ASIC), a field-programmable gate array (FPGA), another programmable logic device, a discrete gate or a transistor logic device, or a discrete hardware component. The processor may implement or perform methods, steps, and logical block diagrams disclosed in this embodiment of the present disclosure. The general purpose processor may be a microprocessor or the processor may be any conventional processor or the like. The steps of the methods disclosed with reference to the embodiments of the present disclosure may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

It can be understood that, the memory in this embodiment of the present disclosure may be a volatile memory or a non-volatile memory, or may include both a volatile memory and a non-volatile memory. The non-volatile memory may be a read-only memory (ROM), a programmable ROM (PROM), an erasable programmable ROM (EPROM), an electrically EPROM (EEPROM), or a flash memory. The volatile memory may be a random access memory (RAM), and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory for the system and the method described herein intends to include, but not limited to, the memories and any other suitable types of memories.

It should be understood that, the foregoing description of the memory is illustrative, but is not limitative. For example, the memory in the embodiments of the present disclosure may be alternatively a static RAM (SRAM), a dynamic RAM (DRAM), a synchronous DRAM (SDRAM), a double data rate SDRAM (DDR SDRAM), an enhanced SDRAM (ESDRAM), a synchlink SDRAM (SLDRAM), a direct rambus RAM (DR RAM), or the like. That is, the memory described in this embodiment of the present disclosure intends to include, but not limited to, the memories and any other suitable types of memories.

An embodiment of the present disclosure further provides a computer-readable storage medium, configured to store a computer program.

Optionally, the computer-readable storage medium may be applied to the network device in the embodiments of the present disclosure, and the computer program causes a computer to implement corresponding procedures implemented by the network device in the methods in the embodiments of the present disclosure. For brevity, details are not described herein again.

Optionally, the computer-readable storage medium may be applied to the mobile terminal/terminal device in the embodiments of the present disclosure, and the computer program causes a computer to implement corresponding procedures implemented by the mobile terminal/terminal device in the methods in the embodiments of the present disclosure. For brevity, details are not described herein again.

An embodiment of the present disclosure further provides a computer program product, including a computer program instruction.

Optionally, the computer program product may be applied to the network device in the embodiments of the present disclosure, and the computer program instruction causes a computer to implement corresponding procedures implemented by the network device in the methods in the embodiments of the present disclosure. For brevity, details are not described herein again.

Optionally, the computer program product may be applied to the mobile terminal/terminal device in the embodiments of the present disclosure, and the computer program instruction causes a computer to implement corresponding procedures implemented by the mobile terminal/terminal device in various methods in the embodiments of the present disclosure. For brevity, details are not described herein again.

An embodiment of the present disclosure further provides a computer program.

Optionally, the computer program may be applied to the network device in the embodiments of the present disclosure, and when run on a computer, the computer program causes the computer to implement corresponding procedures implemented by the network device in the methods in the embodiments of the present disclosure. For brevity, details are not described herein again.

Optionally, the computer program may be applied to the mobile terminal/terminal device in the embodiments of the present disclosure, and when run on the computer, the computer program causes the computer to implement corresponding procedures implemented by the mobile terminal/terminal device in the methods in the embodiments of the present disclosure. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the method embodiments of the present disclosure. The foregoing storage medium includes any medium that can store program code, such as a universal serial bus (USB) flash disk, a removable hard disk, a ROM, a RAM, a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting a signal, comprising:
    determining, by a terminal device, first indication information, wherein the first indication information is used for indicating channel access priority information and an association relationship between a first uplink transmission opportunity used for uplink transmission and a first downlink transmission opportunity used for downlink transmission, wherein the terminal device performs the uplink transmission through a second channel access type, the second channel access type is channel detection based on a contention window, and a size of the contention window is determined according to the channel access priority; and
    sending, by the terminal device, the first indication information to a network device in a time unit corresponding to the first uplink transmission opportunity.

2. The method according to claim 1, wherein the association relationship comprises: association information between the first uplink transmission opportunity and the first downlink transmission opportunity, wherein the association information comprises at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

3. The method according to claim 1, wherein a time interval between the time unit of the first downlink transmission opportunity and the time unit of the first uplink transmission opportunity is a first time interval.

4. The method according to claim 3, wherein the first time interval is indicated by the first indication information, or is a predefined time interval.

5. A method for transmitting a signal, comprising:
    receiving, by a network device, first indication information sent by a terminal device, wherein the first indication information is used for indicating channel access priority information and an association relationship between a first uplink transmission opportunity used for uplink transmission and a first downlink transmission opportunity used for downlink transmission, wherein the uplink transmission is performed by the terminal device through a second channel access type, the second channel access type is channel detection based on a contention window, and a size of the contention window is determined according to the channel access priority; and
    determining, by the network device according to the first indication information, the first downlink transmission opportunity used for downlink transmission.

6. The method according to claim 5, wherein the association relationship comprises: association information between the first uplink transmission opportunity and the first downlink transmission opportunity, wherein the association information comprises at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

7. The method according to claim 5, wherein a time interval between the time unit of the first downlink transmission opportunity and the time unit of the first uplink transmission opportunity is a first time interval.

8. The method according to claim 7, wherein the first time interval is indicated by the first indication information, or is a predefined time interval.

9. A terminal device, comprising a processor and a memory, wherein the memory is configured to store a computer program, and the processor is configured to invoke and run the computer program stored in the memory, to perform:
    determining first indication information, wherein the first indication information is used for indicating channel access priority information and an association relationship between a first uplink transmission opportunity used for uplink transmission and a first downlink transmission opportunity used for downlink transmission, wherein the terminal device performs the uplink transmission through a second channel access type, the second channel access type is channel detection based on a contention window, and a size of the contention window is determined according to the channel access priority; and sending the first indication information to a network device in a time unit corresponding to the first uplink transmission opportunity.

10. The terminal device according to claim 9, wherein the association relationship comprises: association information between the first uplink transmission opportunity and the first downlink transmission opportunity, wherein the association information comprises at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

11. The terminal device according to claim 9, wherein a time interval between the time unit of the first downlink transmission opportunity and the time unit of the first uplink transmission opportunity is a first time interval.

12. The terminal device according to claim 11, wherein the first time interval is indicated by the first indication information, or is a predefined time interval.

13. The terminal device according to claim 9, wherein the association relationship comprises: whether a time unit of the first uplink transmission opportunity comprises a time unit of the first downlink transmission opportunity.

14. The terminal device according to claim 9, wherein the processor is further configured to perform:
    sending a message 3 (MSG3) used for random access to the network device, the MSG3 carrying the first indication information.

15. The terminal device according to claim 9, wherein the processor is further configured to perform:
    receiving second indication information sent by the network device, wherein the second indication information is used for indicating the association relationship; and
    determining the second indication information as the first indication information.

16. The terminal device according to claim 15, wherein the processor is further configured to perform:
    receiving the second indication information that is sent by the network device through a physical downlink control channel (PDCCH) order.

17. A network device, comprising a processor and a memory, wherein the memory is configured to store a computer program, and the processor is configured to invoke and run the computer program stored in the memory, to perform steps of the method according to claim 5.

18. The network device according to claim 17, wherein the association relationship comprises: association information between the first uplink transmission opportunity and the first downlink transmission opportunity, wherein the association information comprises at least one of a channel access type of the first uplink transmission opportunity, time interval information between the time unit of the first uplink transmission opportunity and the time unit of the first downlink transmission opportunity, the time unit of the first downlink transmission opportunity, and a channel access type of the first downlink transmission opportunity.

19. The network device according to claim 17, wherein a time interval between the time unit of the first downlink transmission opportunity and the time unit of the first uplink transmission opportunity is a first time interval.

20. The network device according to claim 19, wherein the first time interval is indicated by the first indication information, or is a predefined time interval.

* * * * *